O. A. WIBERG.
TURBINE WHEEL.
APPLICATION FILED APR. 3, 1917.
1,227,986.
Patented May 29, 1917.
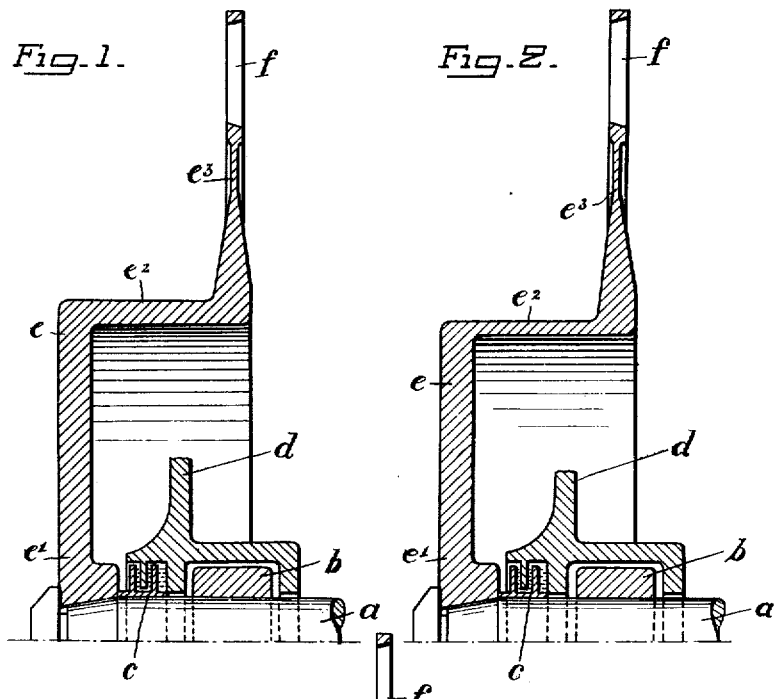
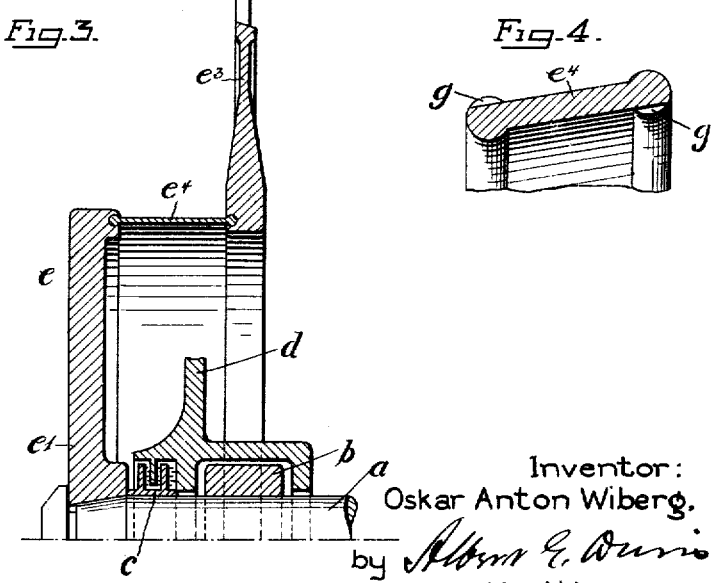
Inventor:
Oskar Anton Wiberg.
by
His Attorney.

UNITED STATES PATENT OFFICE.

OSKAR ANTON WIBERG, OF FINSPONG, SWEDEN, ASSIGNOR, BY MESNE ASSIGNMENTS, TO AKTIEBOLAGET LJUNGSTRÖMS ÅNGTURBIN, OF STOCKHOLM, SWEDEN, A CORPORATION OF SWEDEN.

TURBINE-WHEEL.

1,227,986.      Specification of Letters Patent.      Patented May 29, 1917.

Application filed April 3, 1917. Serial No. 159,596.

*To all whom it may concern:*

Be it known that I, OSKAR ANTON WIBERG, engineer, subject of the King of Sweden, residing at Finspong, in the Kingdom of Sweden, have invented certain new and useful Improvements in Turbine-Wheels, of which the following is a specification.

In some types of elastic fluid turbines it is necessary to mount the rotor on the shaft in such manner that it overhangs the bearing. That is to say, instead of having two bearings for the shaft, one on each side of the rotor, the bearing or bearings are located wholly on one side. The mounting of a rotor in this manner introduces certain difficulties as regards the bearing arrangement which are greatly enhanced if a packing or other device has to be provided between the rotor and the adjacent bearing. In general it may be stated that the greater the distance between the center of gravity of the rotor and the bearing, the greater will be the difficulty in obtaining the proper running balance, especially if the rotor has a high rotative speed.

The object of my invention is to overcome or at least to largely decrease the difficulties incident to this type of construction. Briefly, I accomplish this by making the rotor in two principal portions, one of which is attached to the shaft at one side of the bearing, the other being axially displaced from the first toward the bearing, there being an annular connecting member between. As a result of this construction the center of gravity of the mass can be located nearer the center of the bearing than is possible with a simple disk thereby decreasing the tendency of the rotor to vibrate when in operation. Such an arrangement also enables me to decrease the overall length of the machine, which is a manifest advantage.

For a consideration of what I believe to be novel and my invention, attention is directed to the accompanying description and claims appended thereto.

In the accompanying drawing which is illustrative of my invention, Figure 1 is vertical axial section of a rotor and its supporting means; Fig. 2 is a similar section of a slight modification; Fig. 3 is a similar section of a further modification, and Fig. 4 is a detail view showing an annular connecting member of conical section.

$a$ designates the turbine shaft, $b$ the bearing therefor, $c$ a packing to prevent the escape of elastic fluid around the shaft to the atmosphere and into the bearing from the rotor chamber in the casing $d$, a portion only of which is shown for simplicity.

On the overhanging end of the shaft is mounted the rotor $e$ comprising a disk $e^1$, which is rigidly secured to the shaft and a second portion or ring $e^3$ which surrounds the shaft and occupies a plane passing perpendicularly therethrough. The two portions are connected by an annular member or drum $e^2$. It will be observed that the portion $e^3$ is thick at the base and progressively decreases in section for a portion of its length toward the periphery, the purpose being to provide a construction that will be self supporting when in operation. The rim of the portion $e^3$ is thickened somewhat to provide a suitable support for one or more rows of radially extending blades $f$ which may be of any suitable construction.

Owing to the relation of the parts the center of gravity of the rotor will be nearer the center of the bearing than is possible with a simple disk, and due to this fact the rotor will operate quietly and smoothly even at high peripheral speeds. Furthermore the parts $e^1$ and $e^2$ form an inset in which the packing and a portion of the bearing are located so that the axial length of the whole structure is decreased.

By offsetting the portions $e^1$ and $e^3$ as shown and properly designing them, the heavy stresses due to centrifugal force in the outer part will be uniformly distributed therein which stresses will be quite independent of those in the part $e^1$.

In Fig. 2 the annular member $e^2$ is made relatively thin so that the inner and outer parts may expand and contract due to temperature changes and other causes without causing stresses in one part to be transmitted to the other. Said part $e^2$ may even be so thin that it is resilient to a certain extent.

The preferred form of the invention is illustrated in Fig. 3 where the same general arrangement is followed but the annular member $e^4$ is differently constructed and forms what I term an expansion ring. It is made relatively thin in cross-section and its ends are enlarged to form parts of circular form which are seated in corresponding annular grooves or recesses in the parts $e^1$ and $e^3$. The member is united to the parts $e^1$ and $e^3$ by rolling the metal of said parts adjacent the grooves around the enlarged circular ends of the member. As shown the member $e^4$ is cylindrical but it may be somewhat conical, in which case it is possible to decrease the diameter of the disk or part $e^1$ on the one hand or to enlarge the diameter of the bore of ring or part $e^3$ on the other hand.

It will be evident from the foregoing that the parts $e^1$ and $e^3$ will be capable of expanding and contracting quite independently of each other and that stresses in one part will not be transmitted to the other. Also that the member $e^4$ being cylindrical at its points of attachment the part $e^3$ will be properly centered, which is of course an essential feature.

In order to transmit the torque of the part $e^3$, due to the action of the motive fluid on the blades $f$, to the part $e^1$, and the shaft it is desirable to cut notches $g$ in the enlarged ends of the member $e^4$ into which the metal of said parts $e^1$ and $e^3$ is forced during the rolling operation. Making the inner and outer parts of the rotor separate renders it possible to harden either or both of them which would be difficult if not impossible in a single piece structure.

In the operation of turbine disks, especially those of large diameter revolving at high speeds, the centrifugal forces to which they are subjected slightly loosen them on their shafts. In my improved construction this objectionable feature is entirely obviated by making the outer member $e^3$ self supporting and centering it by the annular connecting member.

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent is:—

1. In a turbine, the combination of a shaft, a bearing therefor, and a rotor for driving the shaft comprising an inner portion which is mounted on the end of the shaft that overhangs the bearing, an outer portion that surrounds the shaft and is axially displaced from the first on the side adjacent the bearing, a member which unites said portions, and blades mounted on the outer portion for driving it and the shaft.

2. In a turbine, the combination of a shaft, a bearing therefor, and a rotor for driving the shaft comprising a disk which is mounted on the end of the shaft that overhangs the bearing, a ring axially displaced from the disk on the bearing side, an annular member that connects the disk and ring, and blades for rotating the shaft which are attached to the ring, the center of gravity of the whole structure lying in a plane that is on the bearing side of the disk.

3. In a turbine rotor, the combination of a shaft, a disk mounted thereon, a self supporting ring located wholly at one side of the disk, radial blades mounted on the periphery of the ring for driving it, and an annular member that connects the disk and ring and through which the torque exerted by the blades is transmitted to the shaft, there being joints between the member, disk and ring which permit limited relative movements of the disk and ring in planes perpendicular to the shaft.

4. In a turbine rotor, the combination of a shaft, a disk mounted thereon, a self supporting ring located wholly at one side of the disk, radial blades mounted on the periphery of the ring, an annular member having ends that are circular in cross-section and are seated in corresponding grooves in both disk and ring, said member serving to hold the ring concentric with the shaft, transmit the torque exerted by the blades to the shaft, and prevent the transmission of strains due to centrifugal force, and means for locking the member to the ring and disk to prevent relative angular movement.

In testimony whereof I affix my signature in presence of two witnesses.

OSKAR ANTON WIBERG.

Witnesses:
 TURA ALUNICAN,
 M. LINDUER.

Copies of this patent may be obtained for five cents each, by addressing the "Commissioner of Patents, Washington, D. C."